2,085,848

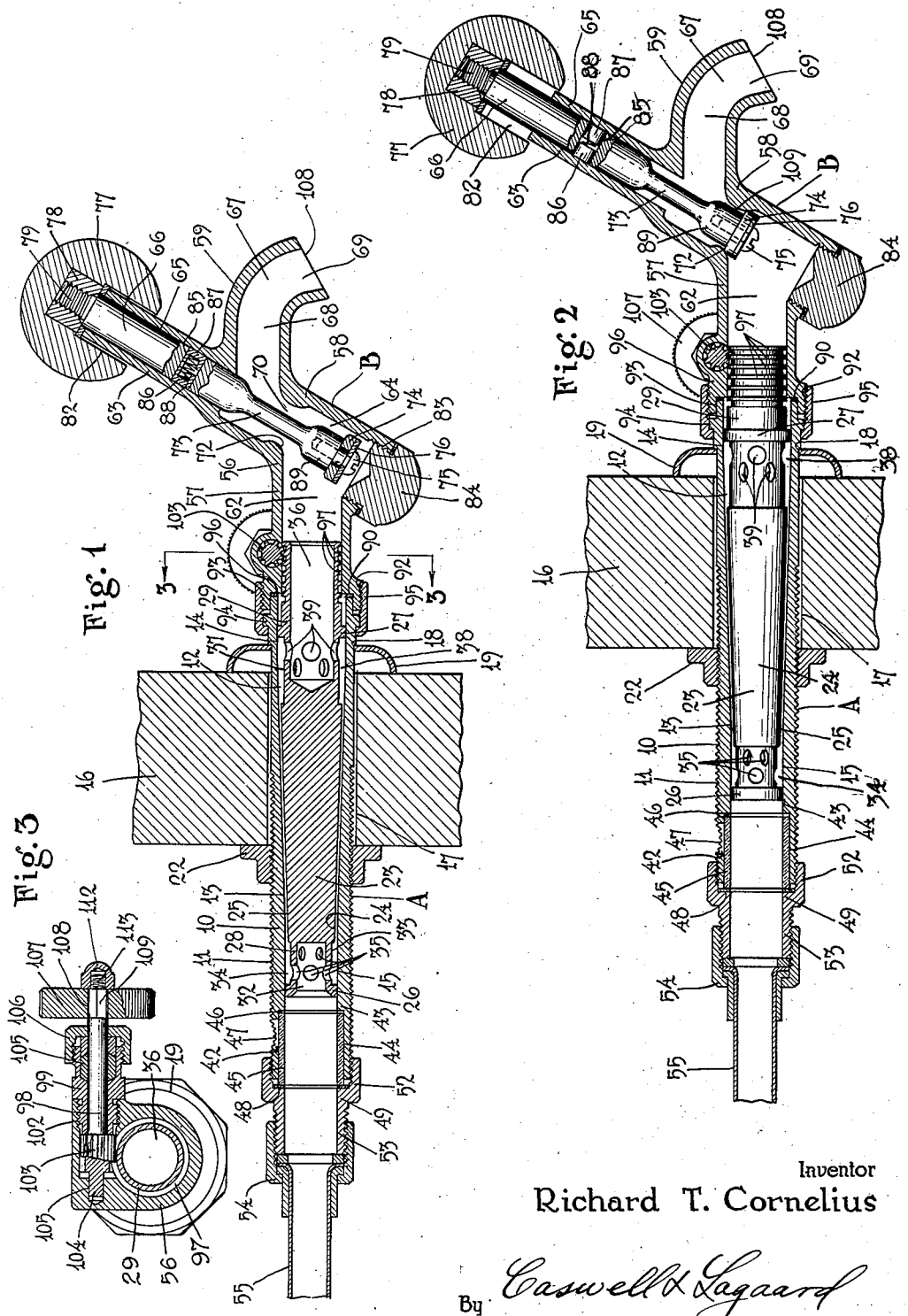
July 6, 1937.  R. T. CORNELIUS  2,085,848
BEER DISPENSING DEVICE
Filed March 23, 1936
Inventor
Richard T. Cornelius
By Caswell & Lagaard
Attorneys Patented July 6, 1937

UNITED STATES PATENT OFFICE 2,085,848

BEER DISPENSING DEVICE

Richard T. Cornelius, Minneapolis, Minn.

Application March 23, 1936, Serial No. 70,364

6 Claims. (Cl. 138—46)

My invention relates to beer dispensing devices and has for an object to provide a device by means of which beer may be drawn in a manner to procure the desired amount of foam or collar on the beer when discharged into any type of drinking vessel.

Another object of the invention resides in providing a device in which the amount of foam produced can be varied.

An object of the invention resides in providing a dispensing device including a flow regulating device and a faucet and in which the rate of flow can be adjusted independently of the operation of the faucet.

Another object of the invention resides in constructing the tubular member with a conical bore having an intermediate conical portion and cylindrical portions at the end thereof and in providing a core constructed with a conical portion adapted to be disposed within the conical portion of the bore in spaced relation thereto and with cylindrical guides at the ends thereof guided for movement within the cylindrical portions of the bore.

An object of the invention resides in providing means for reciprocating said core within the bore to vary the cross sectional area of the annular space between the core and bore.

A feature of the invention resides in providing a rack and pinion for reciprocating the core.

Other objects of the invention reside in the novel combination and arrangement of parts and in the details of construction hereinafter illustrated and/or described.

In the drawing:

Fig. 1 is a longitudinal elevational sectional view of a beer dispensing device applied to a beer cabinet and illustrating an embodiment of my invention and showing the faucet open.

Fig. 2 is a view similar to Fig. 1 illustrating certain of the parts in elevation and showing the faucet closed.

Fig. 3 is a cross sectional view taken on line 3—3 of Fig. 1.

My invention consists of two parts, a flow regulating device which I have indicated in its entirety by the reference numeral A and a faucet indicated in its entirety by the reference numeral B. The particular form and construction of and the arrangement of the various elements of these parts will now be described in detail.

The flow regulating device A consists of a tubular member 10 threaded upon its exterior at one end as indicated at 11. This tubular member is formed with a bore 12 extending throughout the length of the same, which bore is provided intermediate its ends with a conical portion 13. At the outer end of the tubular member 10, bore 12 is provided with a cylindrical portion 14 and at its inner end with another cylindrical portion 15. The cylindrical portion 15 is smaller in diameter than the portion 14. The various portions of this bore function in a manner to be presently described.

For the purpose of illustrating the application of the invention, a portion of a beer cabinet which represents one of the vertical walls thereof has been illustrated in the drawing and designated by the reference numeral 16. This device has a cylindrical horizontal hole 17 in it through which the tubular member 10 of the flow regulating device A extends. The tubular member 10 is mounted on the wall 16 as follows: Near the outer end of the said tubular member is formed thereon a shoulder 18. A collar 19 encircles the tubular member 10 and is seated against the shoulder 18 and also against the front surface of the wall 16 of the beer cabinet. A nut 22 threaded upon the threads 11 of the tubular member 10 seats against the inner surface of the wall 16 of said beer cabinet and holds the tubular member 10 in proper position.

Within the tubular member 10 is provided a core 23 which is constructed with a conical surface 24 of the same degree of taper as the conical surface 13 of bore 12. This conical surface is of smaller dimensions than the portion 13 of bore 12 so that an annular space 25 is formed between the core 23 and tubular member 10 which is constricted in cross section. Core 23 is constructed at its inner end 28 with a collar 26 which is of the same diameter as the cylindrical portion 15 of bore 12 and which slides along said portion of the bore to guide the inner end of the core 23 for reciprocating movement within said bore. At a locality inwardly from the outer end 29 of the core 23 is provided another collar 27 which rides along the cylindrical portion 14 of bore 12 and guides the core 23 at its other end for reciprocating movement within said bore.

The inner end 28 of core 23 is constructed with a hole 32 which extends axially for a short distance into the same, being open to the bore 12 at one end. Encircling this portion of the core 23 is an annular depression or groove 33 which forms a space or passageway 34 between the core 23 and the cylindrical portion 15 of bore 12 and which communicates with the constricted passageway 25 within the regulating device A. A number of radial holes 35 drilled through the end portion 28 of the core 23 bring the hole 32 in communication with the space 34. The outer end 29 of the core 23 is constructed in a similar manner. A hole 36 is drilled axially along said core and extends inwardly into the same and past the collar 27. Encircling the end 29 of core 23 is a depression or groove 37 which is disposed inwardly of the collar 27 and is similar to the groove 33. This groove forms a space or passageway 38 between the core 23 and bore 12 which is in communication with the constricted passageway 25. A number of holes 39 are drilled in the end 29 of the core 23 and bring said space 37 in communication with the hole 36.

In order to observe the condition of the beer entering the faucet a window indicated in its entirety by the reference numeral 42 is utilized which is illustrated in detail in Figs. 1 and 2. This window is constructed as follows: In the extreme end 43 of the tubular member 10 is formed an annular recess 44 in which is inserted a glass tube 45. At the end of the said recess is provided a gasket 46 against which this tube abuts. An opening 47 in the portion 43 of tubular member 10 and registering with the glass tube 45 permits observation of the beer passing through said tube. The other end of the tube 45 is seated against a gasket 48 disposed within a coupling 49. Coupling 49 is provided with a threaded portion 52 which screws upon the threads 11 of the tubular member 10 clamping the glass tube 45 firmly in position and forming a fluid tight connection between the tubular member 10 and glass tube 45. The coupling 49 is constructed with a nipple 53 to which an ordinary pipe connection 54 may be attached, which pipe connection serves to connect the beer supply pipe 55 to the regulating device A.

The faucet B consists of a body 56 having a horizontal portion 57, a forwardly inclined portion 58 and a spout 59. The horizontal portion 57 is constructed with a horizontal passageway 62 which receives the protruding part of the forward end 29 of the core 23 and which communicates with the hole 36 in said core. The part 58 is constructed with a guide 63 at its upper end and is formed with a valve chamber 64 at its lower end. In the guide 63 is provided a cylindrical guideway 65 which guides a plunger 66 for reciprocating movement. The spout 59 is constructed with an outlet passageway 67 having a horizontal portion 68 offset from the inlet passageway 62 and with a depending portion 69 communicating therewith.

Between the outlet passageway 68 and the inlet passageway 62 and within the valve chamber 64 is provided a passageway 70 which is surrounded by a valve seat 72. Plunger 66 is constructed with a valve stem 73 which extends into the valve chamber 64 and which has attached to it a valve head 74. This valve head is adapted to engage the seat 72 and to obstruct flow through the passageway 70. Valve head 74 is attached to the stem 73 by means of a screw 75 threaded into said stem and a washer 76 encircling said screw.

The plunger 66 is operated by means of a ball 77 which may be constructed of any of the plastic compositions now available for the purpose. This ball is provided with a metal insert 78 which is threaded to screw upon threads 79 formed on the end of the plunger 66. To make the faucet B compact a socket 82 is formed in the ball 77 adjacent the insert 78 into which the extreme end of the guide 63 extends when the faucet is open.

In order to insert the plunger 66 into guideway 65, an opening 83 is formed in the body 56 directly opposite the seat 72. This opening is threaded to receive a plug 84 which closes said opening.

To maintain the plunger 66 in open position, friction means are provided which act between said plunger and the guide 63. For this purpose a transversely extending hole 85 is formed in plunger 66. Two shoes 86 and 87 are disposed in this hole and are urged apart by means of a compression coil spring 88, disposed between the same. These shoes bear against the guideway 65 of the guide 63 and hold the plunger 66 in adjusted position.

Adjacent the valve head 74 on stem 73 of plunger 66 is an enlargement 89 of said stem which fits closely to the wall of passageway 70 near the valve seat 72 and forms in conjunction therewith a constriction through which the beer must travel in leaving the spout 59. This enlargement functions in a manner to be presently described in detail.

The faucet body 56 is attached to the tubular member 10 as follows: On the extreme end of the portion 57 of said body are formed external threads 92 while within the interior of the same is formed an annular recess 93. Tubular member 10 extends into this recess and is constructed with a collar 94 in proximity thereto. A threaded cap 95 encircles the said tubular member and engages the collar 94. This cap serves to draw the end of the tubular member 10 into engagement with a gasket 90 seated against a shoulder 96 formed at the end of the recess 93 forming a fluid tight connection and thereby holding the faucet rigidly attached to the tubular member 10.

For the purpose of reciprocating core 23 to increase or decrease the cross sectional area of the constricted passageway 25, the following construction is employed. Formed on the end 29 of core 23 are a number of annular gear teeth 97 which are spaced from one another and which in conjunction form a rack. A spindle 98 is journaled in a bushing 99 which in turn is screwed into threads 102 formed in the portion 57 of body 56 of faucet B. This spindle carries a pinion 103 which meshes with the rack teeth 97. Spindle 98 is further constructed with a stub shaft 104 at the extreme end thereof which is journaled in a bearing 105 formed in the portion 57 of housing 56. The bushing 99 is constructed with a stuffing box 110 and is threaded to receive a gland 106 which forms a fluid tight connection between the spindle 98 and the body 56. Spindle 98 may be rotated by means of a hand wheel 107. This hand wheel is constructed with a square hole 108 extending through the same, which hole receives a square shank 109 on the end of the spindle 98. A nut 112 screwed upon threads 113 at the end of said spindle holds the hand wheel 107 rigidly attached to the spindle. It will be readily comprehended that the pinion 103 may be rotated upon rotating the hand wheel 107 and upon such movement core 23 may be reciprocated longitudinally within the bore 12, being guided by the two collars 26 and 27 sliding in the cylindrical portions 15 and 14 of said bore.

The operation of the invention is as follows: The beer upon leaving pipe 55 passes through the glass tube 45 where the same may be viewed through the window 42. The beer on entering the tubular member 10 passes into the hole 32 in the end of the core 23 thence through the holes 35 into space 34 and from this space into the constricted passageway 25. In flowing through the passageway 25 sufficient friction is afforded to reduce the pressure of the beer so that when the beer leaves the said passageway the pressure is considerably less and the tendency to foam is greatly reduced. The beer on leaving passageway 25 enters the space 38 and from there passes through the holes 39 and into the hole 36 in the end 29 of core 23. This hole is in communication with the passageway 62 in the portion 57 of body 56 and passageway 62 communicates with valve chamber 64. The beer hence passes through these passageways and into valve chamber 64. From valve chamber 64 the beer passes past the seat 72 through passageway 70 and into the portion 68 of passageway 67 of spout 59, and is then discharged through the portion 69 of said passageway and into the drinking vessel to be filled. By cutting the end 108 of the spout 59 at an angle as shown in Fig. 1 and by making the portion 69 of said passageway extremely short, the passageway 67 becomes automatically vented by air entering the upper portion of said passageway while the beer is leaving the lower portion. When the plunger 66 is partly raised so as to bring the enlargement 89 within the passageway 70, a constriction such as indicated at 109 in Fig. 2 is provided which causes agitation of the beer and produces foaming thereof. By holding the plunger 66 at the proper position, it can readily be seen that clear beer or beer without any amount of foam or collar can be produced. By rotating the hand wheel 107 to vary the cross sectional area of the constricted passageway 25, the rate of flow of the beer through the device can be regulated. The device is so regulated that the desired rate of flow can be secured, by moving the plunger 66 inwardly as far as it will go. By then raising the said plunger the flow is entirely shut off.

My invention is highly advantageous in that an extremely compact and efficient device is provided which may be installed in existing beer dispensing systems without reconstruction thereof. The regulating device is mounted in that portion of the dispensing device which extends through the bar fixture or beer cabinet so that the said regulating device extends but within a short distance into the interior of the cabinet, thereby making it possible to install the device in cabinets where the space is extremely limited. By means of the adjustment provided a clear beer can be drawn at any desired flow within the limits of the device. In addition any amount of agitation can be given to the beer so that any percentage of foam forming the collar of the beer may be procured. My invention is extremely simple to operate and has a minimum number of moving parts. There are no parts in my invention which will readily get out of order and the entire device will operate indefinitely.

Changes in the specific form of my invention, as herein disclosed, may be made within the scope of what is claimed without departing from the spirit of my invention.

Having described my invention, what I claim as new and desire to protect by Letters Patent is:

1. In combination, a member having a bore therein defined by a conical wall and cylindrical walls at the ends of the conical wall, a conical core smaller than said bore and disposed within the same in spaced relation to the walls thereof to form an annular restricted passageway therebetween, and guides at the ends of said core, said guides being slidably mounted in the portions of said bore defined by the cylindrical walls, said cylindrical walls guiding said core for axial movement along said bore to vary the cross sectional area of said passageway, said core being constructed at said guides to form passageways communicating with said restricted passageway and extending past said guides.

2. In combination, a member having a bore therein defined by a conical wall and cylindrical walls at the ends of the conical wall, a conical core smaller than said bore and disposed within the same in spaced relation to the walls thereof to form an annular restricted passageway therebetween, collars formed on the ends of said core and engaging said cylindrical walls, and serving as guides for guiding said core for axial movement along said bore to vary the cross sectional area of said passageway, said core being constructed at the locality of said collars to form passageways communicating with said restricted passageway and extending past said collars.

3. In combination, a member having a bore therein defined by a conical wall and cylindrical walls at the ends of the conical wall, a conical core smaller than said bore and disposed within the same in spaced relation to the walls thereof to form an annular restricted passageway therebetween, collars formed on the ends of said core and engaging said cylindrical walls, and serving as guides for guiding said core for axial movement along said bore to vary the cross sectional area of said passageway, said core being constructed adjacent said collars with transverse holes communicating with said restricted passageway, and at its ends with longitudinal holes communicating with said transverse holes to form passageways communicating with said restricted passageway and extending past said collars.

4. In combination, a member having a bore therein defined by a conical wall and cylindrical walls at the ends of the conical wall, a conical core smaller than said bore and disposed within the same in spaced relation to the walls thereof to form an annular restricted passageway therebetween, collars formed on the ends of said core and engaging said cylindrical walls, and serving as guides for guiding said core for axial movement along said bore to vary the cross sectional area of said passageway, said core being constructed adjacent said collars with recesses communicating with said restricted passageway together with transverse holes communicating with said recesses, and at its ends with longitudinal holes communicating with said transverse holes to form passageways communicating with said restricted passageway and extending past said collars.

5. In combination, a member having a bore therein defined by a conical wall and cylindrical walls at the ends of the conical wall, a conical core smaller than said bore and disposed within the same in spaced relation to the walls thereof to form an annular restricted passageway therebetween, and guides at the ends of said core, said guides being slidably mounted in the portions of said bore defined by the cylindrical walls, said cylindrical walls guiding said core for axial movement along said bore to vary the cross sectional area of said passageway, and means providing passageways communicating with said restricted passageway and extending past said guides.

6. In a beer dispensing device a tubular member having a conical bore, a conical core disposed within the bore of said member and spaced from said bore to form an annular restricted passageway through which the beer flows, means for guiding said core for axial movement within said bore to vary the cross sectional area of said passageway, an extension on said core at one end thereof, a plurality of axially spaced annular gear teeth on said extension, concentric with said core and forming a rack extending longitudinally of the core, and a pinion rotatably mounted relative to said member and engaging said rack for reciprocating said core within the bore.

RICHARD T. CORNELIUS.